US009142190B2

(12) United States Patent
Wu et al.

(10) Patent No.: US 9,142,190 B2
(45) Date of Patent: Sep. 22, 2015

(54) METHOD FOR COMPENSATING LARGE VIEW ANGLE MURA AREA OF FLAT DISPLAY PANEL

(71) Applicant: Shenzhen China Star Optoelectronics Technology Co., Ltd., Guangdong (CN)

(72) Inventors: Chihhao Wu, Shenzhen (CN); Liwei Chu, Shenzhen (CN); Jhenwei He, Shenzhen (CN); Yuyeh Chen, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 129 days.

(21) Appl. No.: 13/824,422

(22) PCT Filed: Mar. 12, 2013

(86) PCT No.: PCT/CN2013/072504
§ 371 (c)(1),
(2) Date: Mar. 18, 2013

(65) Prior Publication Data

US 2014/0253602 A1 Sep. 11, 2014

(30) Foreign Application Priority Data

Mar. 11, 2013 (CN) .......................... 2013 1 0076695

(51) Int. Cl.
*G09G 5/00* (2006.01)
*G06F 3/038* (2013.01)
*G09G 5/10* (2006.01)

(52) U.S. Cl.
CPC ........................................ *G09G 5/10* (2013.01)

(58) Field of Classification Search
USPC ............................. 345/77, 87–104, 690–697; 348/246–247; 349/192
See application file for complete search history.

(56) References Cited

U.S. PATENT DOCUMENTS

2004/0027361 A1* 2/2004 Chow ............................ 345/690
2004/0217981 A1* 11/2004 Bu ................................ 345/690

(Continued)

FOREIGN PATENT DOCUMENTS

CN 101315745 A 12/2008
CN 102426816 A 4/2012

(Continued)

*Primary Examiner* — Lun-Yi Lao
*Assistant Examiner* — MD Saiful A Siddiqui
(74) *Attorney, Agent, or Firm* — Andrew C. Cheng

(57) ABSTRACT

A method for compensating large view angle Mura area of a flat display, comprising the steps of: 1) providing a flat panel including a number of main pixels, and a Mura area and a normal area; 2) setting two or more than two main pixels as a set of Mura area brightness adjustment units; 3) providing a driving circuit for driving the number of main pixels within the flat panel, and the driving circuit supplying a number of gamma voltages; and 4) using the driving circuit to apply two or more than two different gamma voltages to the set of main pixels within the Mura area brightness adjustment units such that the gray scales of Mura area within a center view area and the large view angle area are closer to the gray scales of the normal area thereby achieving a uniform brightness across the flat panel. Accordingly, with the method provided, the gray scales of the central view and the large view angle of the Mura area are substantially closer to the gray scales of the normal area. The yield of the flat panel is increased, and the quality of the flat display using such a flat panel is also guaranteed.

7 Claims, 4 Drawing Sheets

(56) References Cited

U.S. PATENT DOCUMENTS

| | | | | |
|---|---|---|---|---|
| 2005/0280624 | A1 | 12/2005 | Liu | |
| 2008/0284794 | A1* | 11/2008 | Wang et al. | 345/618 |

FOREIGN PATENT DOCUMENTS

| | | | |
|---|---|---|---|
| CN | 102855856 | A | 1/2013 |
| TW | 200847123 | A | 12/2008 |

* cited by examiner

METHOD FOR COMPENSATING LARGE VIEW ANGLE MURA AREA OF FLAT DISPLAY PANEL

FIELD OF THE INVENTION

The present invention relates to a technical field of display, and more particularly, to a method for compensating large view angle Mura area of flat display panel.

DESCRIPTION OF PRIOR ART

With the development of the modern technology, there are a number of electronic devices related to process of information. In the early ages, he most common display is a cathode ray tube (Cathode Ray Tube, CRT) displays. However, due to its bulky and power consumption, and the radiation generated by the display are harmful to the health of users of prolonged time. Therefore, in today market, CRT displays has been gradually replaced by the liquid crystal display (Liquid Crystal Display, LCD).

With the development of science and technology as well as the requirements from modern life, the size and dimension of the flat display today has become larger and larger, especially in liquid crystal displays. It has grown from the previous 14-inch, 17-inch, into nowadays 40-inch or more than 40-inch. Large size flat panel displays require a large-size flat-display panel to support; therefore, today's large-size flat panel has become a mainstream of the LCD industry. In addition, those large size flat panel has also incorporated with fancy and complicated technology so as to meet the requirements from the consumers. However, the flat display panel of large size and high definition is destined to accompany by the production on the unevenness of the brightness. Accordingly, there is a high proportion rate that the flat display panel would create the so-called Mura area, as the entire surface of the flat panel cannot reach an even brightness.

Referring to FIG. 1, conventionally, a counter measurement for the Mura area of the large-size flat-panel is disclosed. After the flat panel of large scale is manufactured, the gray scales within the Mura is adjusted to the identical values of the gray scales within the normal area so as to reach to an evenness of the brightness across the flat panel. By this arrangement, the chance of a Mura being observed is reduced, while the overall evenness of the brightness can be increased. This process has been referred to as a De-Mura process by this skilled in the art.

However, there is a very much high possibility of failing to adjust the Large view angle Mura area to the equivalent value of the normal area by simply applying the De-Mura process which works on the brightness of the central view area and the normal area such as shown in FIG. 2. Referring to FIGS. 3 and 4, which is a gray scale curve of a central view and a large view angle area of a large-size flat display, in which "a" represents the gray scale curve of the central view after the De-Mura process; "b" represents the gray scale curve of the Mura area of the central view after the De-Mura process; "c" represents the gray scale curve of the normal area of the large view angle area after the De-Mura process; and "d" represents the gray scale curve of the Mura area of the large view angle area after the De-Mura process. It can be readily seen from the curves that after the Mura area and the central view have been adjusted to achieve the evenness, in the large view angle, because of the characteristic of the Mura area, its gray scale curve can hardly be equivalent to the normal area. As a result, this inconsistence of brightness may detrimental to the quality of the flat panel, and yield of the flat panel can be dragged down.

SUMMARY OF THE INVENTION

It is an object of the present invention to provide a method for compensating large view angle Mura area of a flat display such that the Mura area can be modified to demonstrate a gray scale more closer to a gray scale of a normal area from all kinds of angles of view thereby increasing the yield of the manufacturing of the flat panel which in turn benefits the quality of a flat display made from the flat panel.

It is an object of the present invention to provide a method for compensating large view angle Mura area of a flat display, comprising the steps of:

1) providing a flat panel including a number of main pixels, and a Mura area and a normal area.

2) setting two or more than two main pixels as a set of Mura area brightness adjustment units;

3) providing a driving circuit for driving the number of main pixels within the flat panel, and the driving circuit supplying a number of gamma voltages; and 4) using the driving circuit to apply two or more than two different gamma voltages to the set of main pixels within the Mura area brightness adjustment units such that the gray scales of Mura area within a center view area and the large view angle area are closer to the gray scales of the normal area thereby achieving a uniform brightness across the flat panel.

Wherein the substantial operation of the step 2) is dividing the Mura area into a number of brightness adjustment areas, each of the brightness adjustment areas includes two or more than two main pixels and having the brightness adjustment units as the Mura area brightness adjustment units.

Wherein the main pixels in the Mura area brightness adjustment units are identical to each other or different to each other.

Wherein the step 4) further comprising the following steps:

4.1) supplying two or more than two different gamma voltages to the number of main pixels within the Mura area brightness adjustment units;

4.2) observing the overall brightness of the flat panel, if the gray scales of Mura area within a center view area and the large view angle area are closer to the gray scales of the normal area, then the adjustment is completed; if there is a substantial difference between the gray scales of Mura area within the center view area and the large view angle area are closer to the gray scales of the normal area, then it is determined that there is an uneven brightness within the Mura area, and proceeding to step 4.3) for further adjusting; and 4.3) while in adjusting the gamma voltage to the number of main pixels within the Mura area brightness adjustment units, adjusting the gamma voltage in the normal area as well so as to drive the gray scale of the central view area and large view angle area closer to the gray area of the normal area thereby achieving an even brightness across the flat display.

Wherein each one of the main pixels within the Mura area brightness adjustment units is driven by two or more than two gamma voltages calculated by a computing method, and during the period of adjusting, if the gray scales of Mura area within a center view area and the large view angle area are closer to the gray scales of the normal area, then the adjustment is completed, otherwise, continuing the adjustment till all the gamma voltages are exhausted.

Wherein the step 2) of setting two main pixels or more than two main pixels as two Mura area brightness adjustment units, the main pixels are first and second main pixels.

Wherein in step 4), a first gamma voltage is used to drive the first main pixel, and a second gamma voltage is used to drive the second main pixel, so as to have the gray scales of Mura area within a center view area and the large view angle area are closer to the gray scales of the normal area to achieve an even brightness across the flat panel.

Wherein the gray scales of the set of Mura area within a center view area and the large view angle equals to the sum of the gray scale of each of the main pixels within the Mura area brightness adjustment units.

Wherein the driving circuit utilizes the capacitor voltage divider to create the gamma voltage.

A method for compensating large view angle Mura area of a flat display, comprising the steps of:

1) providing a flat panel including a number of main pixels, and a Mura area and a normal area;

2) setting two or more than two main pixels as a set of Mura area brightness adjustment units;

3) providing a driving circuit for driving the number of main pixels within the flat panel, and the driving circuit supplying a number of gamma voltages;

4) using the driving circuit to apply two or more than two different gamma voltages to the set of main pixels within the Mura area brightness adjustment units such that the gray scales of Mura area within a center view area and the large view angle area are closer to the gray scales of the normal area thereby achieving a uniform brightness across the flat panel;

wherein the substantial operation of the step 2) is dividing the Mura area into a number of brightness adjustment areas, each of the brightness adjustment areas includes two or more than two main pixels and having the brightness adjustment units as the Mura area brightness adjustment units;

wherein the main pixels in the Mura area brightness adjustment units are identical to each other or different to each other;

wherein the step 4) further comprising the following steps:

4.1) supplying two or more than two different gamma voltages to the number of main pixels within the Mura area brightness adjustment units;

4.2) observing the overall brightness of the flat panel, if the gray scales of Mura area within a center view area and the large view angle area are closer to the gray scales of the normal area, then the adjustment is completed; if there is a substantial difference between the gray scales of Mura area within the center view area and the large view angle area are closer to the gray scales of the normal area, then it is determined that there is an uneven brightness within the Mura area, and proceeding to step 4.3) for further adjusting;

4.3) while in adjusting the gamma voltage to the number of main pixels within the Mura area brightness adjustment units, adjusting the gamma voltage in the normal area as well so as to drive the gray scale of the central view area and large view angle area closer to the gray area of the normal area thereby achieving an even brightness across the flat display;

wherein each one of the main pixels within the Mura area brightness adjustment units is driven by two or more than two gamma voltages calculated by a computing method, and during the period of adjusting, if the gray scales of Mura area within a center view area and the large view angle area are closer to the gray scales of the normal area, then the adjustment is completed, otherwise, continuing the adjustment till all the gamma voltages are exhausted;

wherein the step 2) of setting two main pixels or more than two main pixels as two Mura area brightness adjustment units, the main pixels are first and second main pixels;

wherein in step 4), a first gamma voltage is used to drive the first main pixel, and a second gamma voltage is used to drive the second main pixel, so as to have the gray scales of Mura area within a center view area and the large view angle area are closer to the gray scales of the normal area to achieve an even brightness across the flat panel;

wherein the gray scales of the set of Mura area within a center view area and the large view angle equals to the sum of the gray scale of each of the main pixels within the Mura area brightness adjustment units; and wherein the driving circuit utilizes the capacitor voltage divider to create the gamma voltage.

The present invention can be concluded with the following advantages. The method for compensating the Mura area of the large view angle of the flat panel utilizes two or more than two main pixels as the Mura area brightness adjustment unit. In addition, a number of gamma voltages are supplied to each of the main pixels located in each of the Mura area brightness adjustment units of the Mura area by a driving circuit. Furthermore, it can also be combined with the adjustment of the gamma voltage of the normal area of the flat panel such that the gray scales of the central view and the large view angle of the Mura area are substantially closer to the gray scales of the normal area. Accordingly, the overall brightness across the flat panel becomes more even and homogenous. The yield of the flat panel is increased, and the quality of the flat display using such a flat panel is also guaranteed.

In order to give a better and thorough understanding to the whole and other intended purposes, features and advantages of the technical solution of the present invention, detailed description will be given with respect to preferred embodiments provided and illustrated herebelow in accompanied drawings. Apparently, the accompanied drawings are merely illustrated for the purpose of explanation, instead of imposing any constrains or limitations to the present invention.

BRIEF DESCRIPTION OF DRAWINGS

Detailed description will be given in view of the accompanied drawings so as to have the characteristics, features, and advantages become more evident, wherein.

DETAILED DESCRIPTION OF PREFERRED EMBODIMENT

In order to give a better and thorough understanding to the whole and other intended purposes, features and advantages of the present invention, detailed description will be given with respect to preferred embodiments provided and illustrated herebelow in accompanied drawings.

Figure 1:
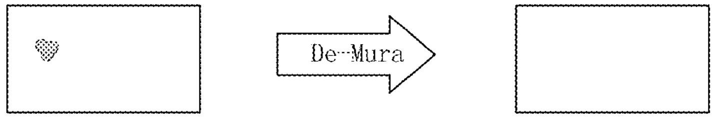
Fig. 1 (Prior Art)
FIG. 1 is an illustration of a De-Mura process used in the existing flat panel.
Figure 2:
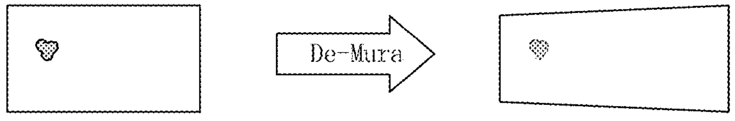
Fig. 2 (Prior Art)
FIG. 2 is an illustration showing that even after the De-Mura process, there still exists Mura area within the large view angle area of flat display of prior art.
Figure 3:
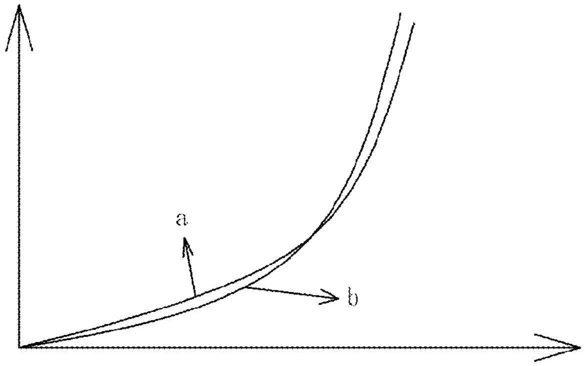
Fig. 3 (Prior Art)
FIG. 3 is an illustration of gray scale curve of a central view of the flat display of prior art during the De-Mura process.
Figure 4:
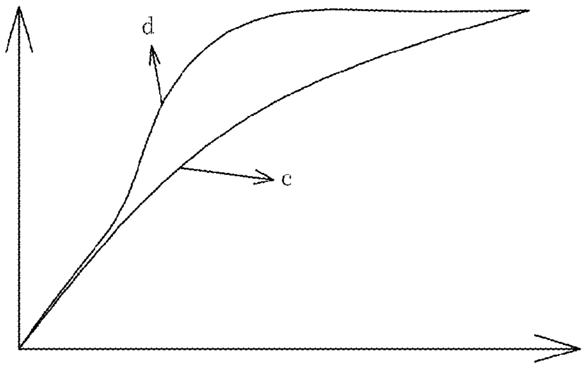
Fig. 4 (Prior Art)
FIG. 4 is an illustration of gray scale curve of a large view angle area of the flat display of prior art during the De-Mura process.
Figure 5:
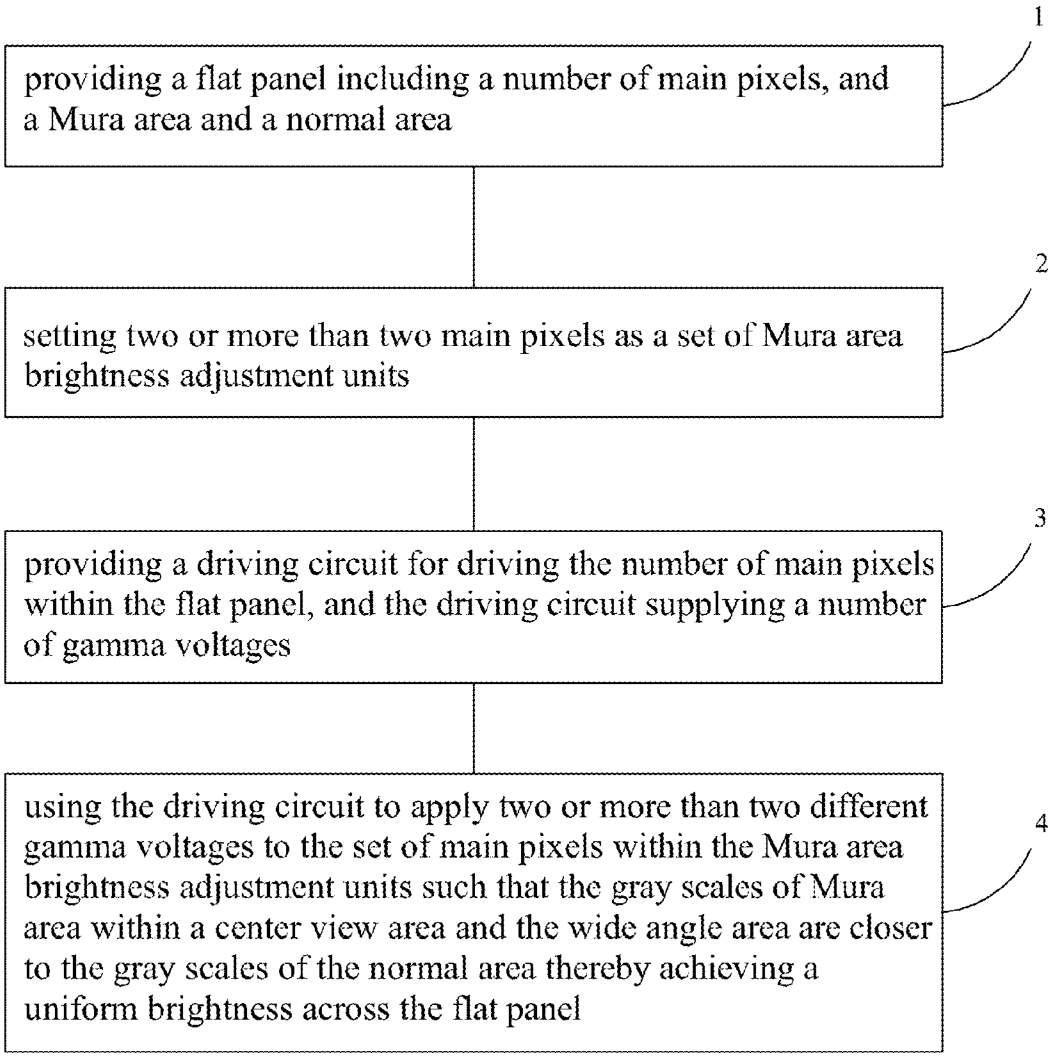
FIG. 5 is a flow chart diagrams illustrating a method for compensating Large view angle Mura area flat panel made in accordance with the present invention.
Figure 6:
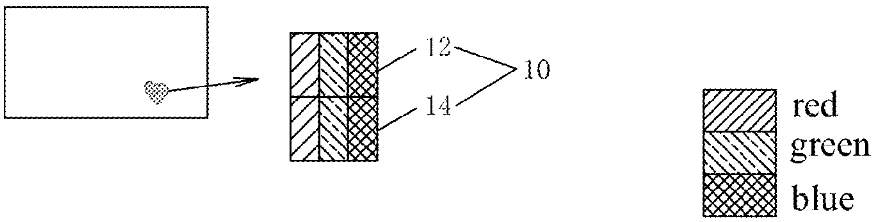
FIG. 6 illustrating the basic principle of the method in compensating the Mura area of the large view angle of the flat display made in accordance with the present invention.
Figure 7:
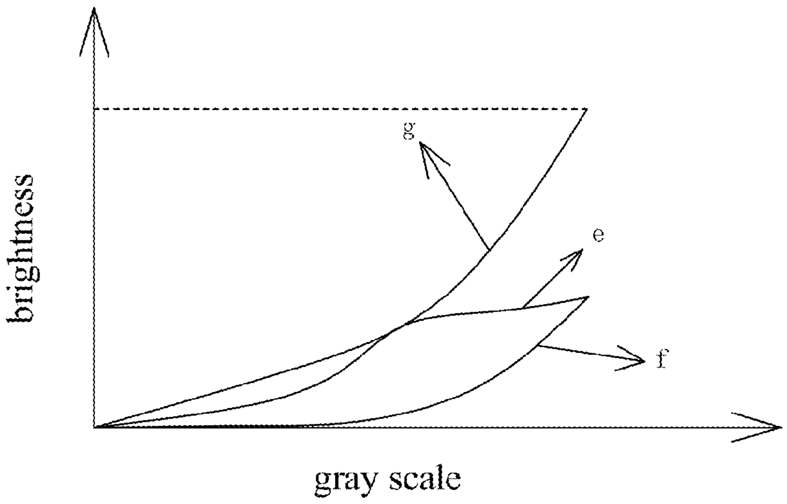
FIG. 7 is a curve showing the gray scale v. brightness of the Mura area of the large view angle flat display made in accordance with the present invention.

Referring to FIGS. 5 to 7, a method for compensating the Mura area of a large view angle of flat panel is provided, and the method includes the steps of followings.

Step 1: Providing a flat panel including a number of main pixels, and a Mura area and a normal area.

Each main pixel includes a red sub-pixel, a green sub-pixel, and a blue sub-pixel, such as shown in FIG. 6. The Mura area and the normal area include a number of main pixels.

Step 2) Setting two or more than two main pixels as a set of Mura area brightness adjustment units.

In this step, the Mura area is divided into a plurality of brightness adjustment areas. Each of the brightness adjustment areas includes two or more than two main pixels. And those brightness adjustment areas are used as the Mura area brightness adjustment units. In addition, the number of the main pixels within the Mura area brightness adjustment units can be identical to each other or different with each other. It can be readily set up according to actual field application.

Referring to FIG. 6, in a preferred embodiment, two main pixels are set up as a set of the Mura area brightness adjustment unit 10 for readily adjusting, and the two main pixels are the first main pixel 12, and a second main pixel 14.

Step 3) providing a driving circuit for driving the number of main pixels within the flat panel, and the driving circuit supplying a number of gamma voltages.

The gamma voltages are derived from one or more than one computing methods. In the preferred embodiment, the driving circuit utilizes a voltage divider to create the gamma voltage, and preferably, a capacitor voltage divider to create the gamma voltage. With this arrangement, the power consumption can be reduced, and is beneficial for energy saving, and more environment friendly.

Step 4) using the driving circuit to apply two or more than two different gamma voltages to the set of main pixels within the Mura area brightness adjustment units such that the gray scales of Mura area within a center view area and the large view angle area are closer to the gray scales of the normal area thereby achieving a uniform brightness across the flat panel.

Wherein the step 4) further comprising the following steps:

Step 4.1) supplying two or more than two different gamma voltages to the number of main pixels within the Mura area brightness adjustment units.

During this procedure, each main pixel can be driven by a plurality of gamma voltages so as to find the more favorable gamma voltage. With this, a best mode can be achieved.

4.2) observing the overall brightness of the flat panel, if the gray scales of Mura area within a center view area and the large view angle area are closer to the gray scales of the normal area, then the adjustment is completed; if there is a substantial difference between the gray scales of Mura area within the center view area and the large view angle area are closer to the gray scales of the normal area, then it is determined that there is an uneven brightness within the Mura area, and proceeding to step 4.3) for further adjusting.

4.3) while in adjusting the gamma voltage to the number of main pixels within the Mura area brightness adjustment units, adjusting the gamma voltage in the normal area as well so as to drive the gray scale of the central view area and large view angle area closer to the gray area of the normal area thereby achieving an even brightness across the flat display.

When the adjustment is merely limited to the gamma voltage of the Mura area, it can hardly meet the requirement. In light of this, the gamma voltage used to adjust the Mura area can be added up with the gamma voltage used to adjust the normal area such that the gray scales of Mura area within a center view area and the large view angle area are closer to the gray scales of the normal area so as to reach the best solution. Accordingly, the yield of the flat panel is increased.

It should be noted that each main pixel located within the set of the Mura area brightness adjustment units is driven by two or more than two gamma voltages derived from a computing method such that a most possible adjustment can be achieved to guarantee the yield of the product. Specially, this can adjust the gray scales more detailedly such the gray scale from different angles of view of the Mura area can be driven to closer to the gray area of the normal area. During the period of adjusting, if the gray scales of Mura area within a center view area and the large view angle area are closer to the gray scales of the normal area, then the adjustment is completed, otherwise, continuing the adjustment till all the gamma voltages are exhausted.

In the Mura area, the gray scales of the central view and large view angle of the Mura area brightness adjustment units equal to the sum of the gray scales of each of the main pixels of the Mura area brightness adjustment units. As shown in FIG. 7, in the preferred embodiment, the first gamma voltage is used to drive the first main pixel 12, and the second gamma voltage is used to drive the second main pixel 14. By this arrangement, the gray scales of the Mura area of the central view and the large view angle are closer to the gray scales of the normal area such that the overall brightness across the flat panel is homogeneous and even. In FIG. 7, the cure represented and designated with "e" is the cure of gray scale v. brightness of the first main pixel; the cure represented and designated with "f" is the cure of gray scale v. brightness of the second main pixel; and the cure designated with "g" is the cure of gray scale v. brightness of the sum of the first and second main pixels, i.e. the Mura area brightness adjustment unit.

In conclusion, the present invention provides a method for compensating the Mura area of the large view angle of the flat panel utilizes two or more than two main pixels as the Mura area brightness adjustment unit. In addition, a number of gamma voltages are supplied to each of the main pixels located in each of the Mura area brightness adjustment units of the Mura area by a driving circuit. Furthermore, it can also be combined with the adjustment of the gamma voltage of the normal area of the flat panel such that the gray scales of the central view and the large view angle of the Mura area are substantially closer to the gray scales of the normal area. Accordingly, the overall brightness across the flat panel becomes more even and homogenous. The yield of the flat panel is increased, and the quality of the flat display using such a flat panel is also guaranteed.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

The invention claimed is:

1. A method for compensating Mura area of wide-angle view of a flat display, comprising the steps of:

1) providing a flat panel including a number of main pixels, and a Mura area and a normal area;
2) setting two or more than two main pixels as a set of Mura area brightness adjustment units;
3) providing a driving circuit for driving the number of main pixels within the flat panel, and the driving circuit supplying a number of gamma voltages;

4) using the driving circuit to apply two or more than two different gamma voltages to the set of main pixels within the Mura area brightness adjustment units such that a gray scales of the Mura area within a center view area and a wide-angle view area are closer to a gray scales of the normal area thereby achieving a uniform brightness across the flat panel;

wherein the substantial operation of the step 2) is dividing the Mura area into a number of brightness adjustment areas, each of the brightness adjustment areas includes two or more than two main pixels and having brightness adjustment units as the Mura area brightness adjustment units;

wherein the step 4) further comprising following steps:

4.1) supplying two or more than two different gamma voltages to the number of main pixels within the Mura area brightness adjustment units;

4.2) observing an overall brightness of the flat panel, if the gray scales of the Mura area within the center view area and the wide-angle view area are closer to the gray scales of the normal area, then the adjustment is completed; if there is a substantial difference between the gray scales of the Mura area within the center view area and the wide-angle view area are closer to the gray scales of the normal area, then it is determined that there is an uneven brightness within the Mura area, and proceeding to step 4.3) for further adjusting;

4.3) while in adjusting the gamma voltage to the number of main pixels within the Mura area brightness adjustment units, adjusting the gamma voltage in the normal area as well so as to drive the gray scale of the central view area and wide-angle view area closer to the gray area of the normal area thereby achieving an even brightness across the flat display; and wherein each one of the main pixels within the Mura area brightness adjustment units is driven by two or more than two gamma voltages calculated by a computing method, and during the period of adjusting, if the gray scales of the Mura area within the center view area and the wide-angle view area are closer to the gray scales of the normal area, then the adjustment is completed, otherwise, continuing the adjustment till all the gamma voltages are exhausted.

2. The method as recited in claim 1, wherein the main pixels in the Mura area brightness adjustment units are identical to each other or different to each other.

3. The method as recited in claim 1, wherein the step 2) of setting two main pixels or more than two main pixels as two Mura area brightness adjustment units, the main pixels are first and second main pixels.

4. The method as recited in claim 3, wherein in step 4), a first gamma voltage is used to drive the first main pixel, and a second gamma voltage is used to drive the second main pixel, so as to have the gray scales of the Mura area within the center view area and the wide-angle view area are closer to the gray scales of the normal area to achieve an even brightness across the flat panel.

5. The method as recited in claim 1, wherein the gray scales of the set of the Mura area within the center view area and the wide-angle view equals to the sum of the gray scale of each of the main pixels within the Mura area brightness adjustment units.

6. The method as recited in claim 1, wherein the driving circuit utilizes a capacitor voltage divider to create the gamma voltage.

7. A method for compensating Mura area of wide-angle view of a flat display, comprising the steps of:

1) providing a flat panel including a number of main pixels, and a Mura area and a normal area;

2) setting two or more than two main pixels as a set of Mura area brightness adjustment units;

3) providing a driving circuit for driving the number of main pixels within the flat panel, and the driving circuit supplying a number of gamma voltages;

4) using the driving circuit to apply two or more than two different gamma voltages to the set of main pixels within the Mura area brightness adjustment units such that a gray scales of the Mura area within a center view area and a wide-angle view area are closer to a gray scales of the normal area thereby achieving a uniform brightness across the flat panel;

wherein the substantial operation of the step 2) is dividing the Mura area into a number of brightness adjustment areas, each of the brightness adjustment areas includes two or more than two main pixels and having the brightness adjustment units as the Mura area brightness adjustment units;

wherein the main pixels in the Mura area brightness adjustment units are identical to each other or different to each other;

wherein the step 4) further comprising the following steps:

4.1) supplying two or more than two different gamma voltages to the number of main pixels within the Mura area brightness adjustment units;

4.2) observing an overall brightness of the flat panel, if the gray scales of the Mura area within the center view area and the wide-angle view area are closer to the gray scales of the normal area, then the adjustment is completed; if there is a substantial difference between the gray scales of the Mura area within the center view area and the wide-angle view area are closer to the gray scales of the normal area, then it is determined that there is an uneven brightness within the Mura area, and proceeding to step 4.3) for further adjusting;

4.3) while in adjusting the gamma voltage to the number of main pixels within the Mura area brightness adjustment units, adjusting the gamma voltage in the normal area as well so as to drive the gray scale of the central view area and the wide-angle view area closer to the gray area of the normal area thereby achieving an even brightness across the flat display;

wherein each one of the main pixels within the Mura area brightness adjustment units is driven by two or more than two gamma voltages calculated by a computing method, and during the period of adjusting, if the gray scales of the Mura area within the center view area and the wide-angle view area are closer to the gray scales of the normal area, then the adjustment is completed, otherwise, continuing the adjustment till all the gamma voltages are exhausted;

wherein the step 2) of setting two main pixels or more than two main pixels as the two Mura area brightness adjustment units, the main pixels are first and second main pixels;

wherein in step 4), a first gamma voltage is used to drive the first main pixel, and a second gamma voltage is used to drive the second main pixel, so as to have the gray scales of the area within the center view area and the wide-angle view area are closer to the gray scales of the normal area to achieve an even brightness across the flat panel;

wherein the gray scales of the set of the Mura area within the center view area and the wide-angle view area equals to the sum of the gray scale of each of the main pixels within the Mura area brightness adjustment units; and wherein the driving circuit utilizes a capacitor voltage divider to create the gamma voltage.

* * * * *